United States Patent
Ozeki

(10) Patent No.: US 11,086,575 B2
(45) Date of Patent: Aug. 10, 2021

(54) INFORMATION PROCESSING APPARATUS AND METHOD

(71) Applicant: FUJIFILM BUSINESS INNOVATION CORP., Tokyo (JP)

(72) Inventor: Kazunori Ozeki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 200 days.

(21) Appl. No.: 16/034,398

(22) Filed: Jul. 13, 2018

(65) Prior Publication Data

US 2019/0034128 A1 Jan. 31, 2019

(30) Foreign Application Priority Data

Jul. 27, 2017 (JP) .............................. JP2017-145804

(51) Int. Cl.
*G06F 3/12* (2006.01)
*G06F 3/0484* (2013.01)
*G06F 9/54* (2006.01)

(52) U.S. Cl.
CPC ........ *G06F 3/1204* (2013.01); *G06F 3/04847* (2013.01); *G06F 3/1225* (2013.01); *G06F 3/1231* (2013.01); *G06F 3/1256* (2013.01); *G06F 3/1285* (2013.01); *G06F 9/543* (2013.01)

(58) Field of Classification Search
CPC .. G06F 3/1204; G06F 3/04847; G06F 3/1225; G06F 3/1231; G06F 3/1256; G06F 3/1285; G06F 9/543; G06F 3/0484; G06F 3/0481; G06F 3/1254; G06F 3/1253
See application file for complete search history.

(56) References Cited

U.S. PATENT DOCUMENTS

| 8,988,715 | B2 | 3/2015 | Tarumi | |
| 2015/0012882 | A1* | 1/2015 | Hasama | G06F 3/0481 715/808 |
| 2015/0261480 | A1* | 9/2015 | Omura | G06F 3/1231 358/1.13 |
| 2015/0286511 | A1* | 10/2015 | Mickens | G06F 9/4856 719/320 |

FOREIGN PATENT DOCUMENTS

| JP | 5230827 B1 | 7/2013 |
| JP | 5911309 B2 | 4/2016 |

* cited by examiner

*Primary Examiner* — Iriana Cruz
(74) *Attorney, Agent, or Firm* — Oliff PLC

(57) ABSTRACT

An information processing apparatus includes a first application running unit, a first function execution unit, a second application running unit, and a second function execution unit. The first application running unit operates in an execution environment and runs an application program. The first function execution unit operates in the execution environment and provides a specific function after the first function execution unit is called by the first application running unit. The second application running unit operates in a different execution environment different from the execution environment and runs a different application program different from the application program. The second function execution unit operates in the different execution environment, starts the first function execution unit after the second function execution unit is called by the second application running unit, acquires a result of processing performed by the first function execution unit, and transmits the result to the second application running unit.

14 Claims, 7 Drawing Sheets

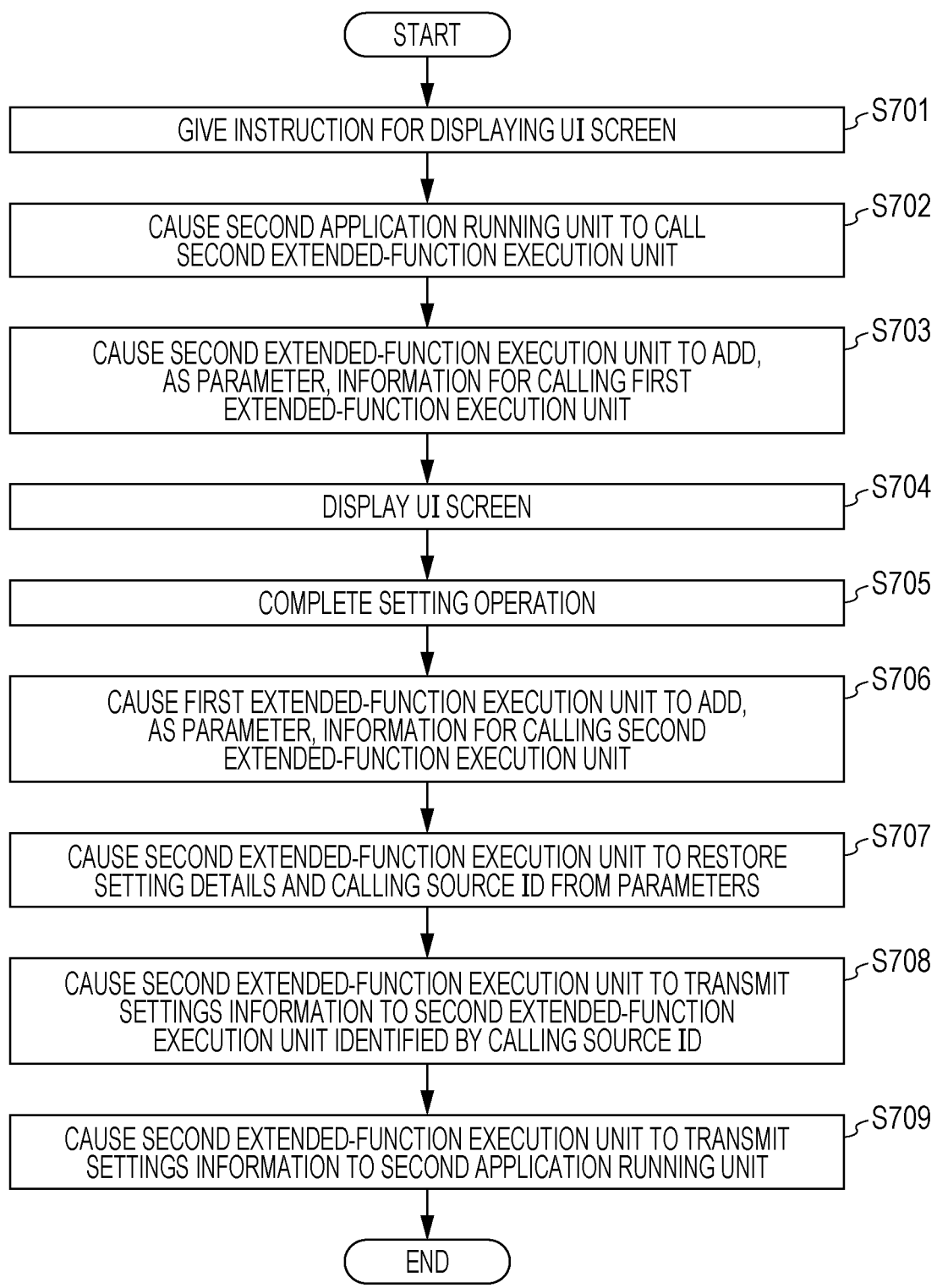

INFORMATION PROCESSING APPARATUS AND METHOD

CROSS-REFERENCE TO RELATED APPLICATIONS

This application is based on and claims priority under 35 USC 119 from Japanese Patent Application No. 2017-145804 filed Jul. 27, 2017.

BACKGROUND

(i) Technical Field

The present invention relates to an information processing apparatus and a method.

(ii) Related Art

In a case where the function of a program running on an operating system (OS) capable of providing multiple execution environments is to be implemented in each execution environment, the program needs to be prepared for each execution environment. In addition, in a case where an operation is to be performed in an execution environment and a function provided by a program designed to run in a different execution environment is intended to be used, switching from one execution environment to the other is needed.

As described above, in a case where a desired function is used after switching from one execution environment to the other, environment-dependent operability is changed after the execution environment switching compared with the operability before the switching. The change causes load on an operator.

In contrast, in a case where a program that runs on an OS capable of providing multiple execution environments and that provides the same function in the execution environments is prepared for each execution environment, efforts for program development are increased. Further, providing the function in the execution environments different from each other leads to user interfaces (UIs) different from each other, and the operator is burdened.

SUMMARY

According to an aspect of the invention, there is provided an information processing apparatus including a first application running unit, a first function execution unit, a second application running unit, and a second function execution unit. The first application running unit operates in an execution environment and runs an application program. The first function execution unit operates in the execution environment and provides a specific function after the first function execution unit is called by the first application running unit. The second application running unit operates in a different execution environment different from the execution environment and runs a different application program different from the application program. The second function execution unit operates in the different execution environment, starts the first function execution unit after the second function execution unit is called by the second application running unit, acquires a result of processing performed by the first function execution unit, and transmits the result to the second application running unit.

BRIEF DESCRIPTION OF THE DRAWINGS

An exemplary embodiment of the present invention will be described in detail based on the following figures, wherein:

FIG. 7 is a flowchart illustrating operations performed by the information processing apparatus when a driver setting operation is performed from the second application running unit in the second implementation example.

DETAILED DESCRIPTION

Configuration of Information Processing Apparatus

Hereinafter, an exemplary embodiment of the present invention will be described in detail with reference to the attached drawings.

Figure 1:
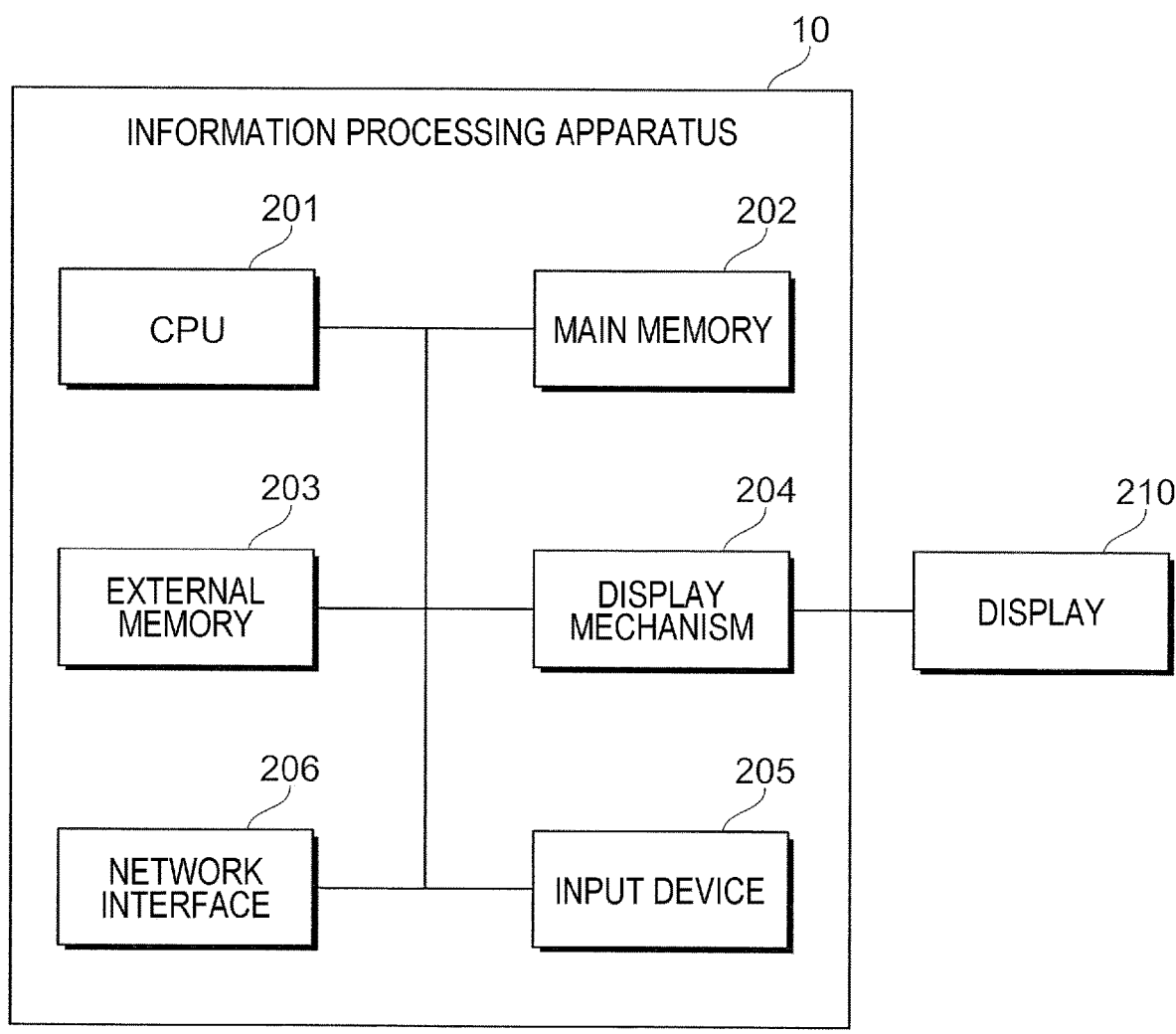
FIG. 1 is a diagram illustrating an example hardware configuration of an information processing apparatus.

FIG. 1 is a diagram illustrating an example hardware configuration of an information processing apparatus. An information processing apparatus 10 is a computer and is implemented by, for example, a personal computer. The information processing apparatus 10 includes a central processing unit (CPU) 201, a main memory 202, and an external memory 203. The CPU 201 is an arithmetic unit, and the main memory 202 and the external memory 203 are memories. The CPU 201 runs a program stored in the external memory 203 in such a manner as to load the program on the main memory 202. As the main memory 202, for example, a random access memory (RAM) is used. As the external memory 203, for example, a magnetic disk device, a solid state drive (SSD), or another device is used. The information processing apparatus 10 further includes a display mechanism 204 for performing display on and output to a display 210 and an input device 205 on which an operator of the information processing apparatus 10 performs an input operation. As the input device 205, for example, a keyboard, a mouse, or another device is used. The information processing apparatus 10 also includes a network interface 206 for connecting to a network.

Figure 2:
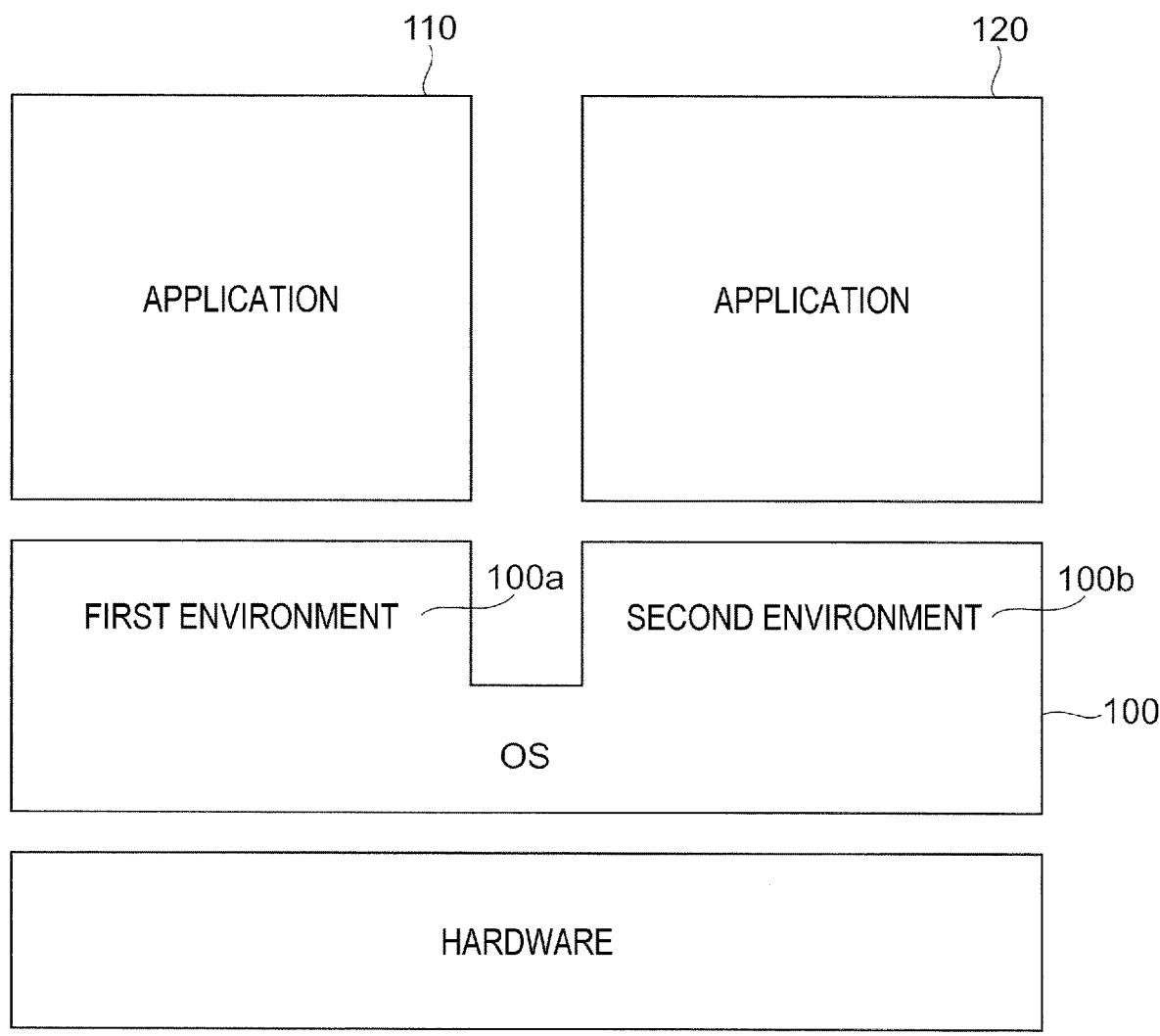
FIG. 2 is a diagram illustrating an example software configuration of the information processing apparatus.

FIG. 2 is a diagram illustrating an example software configuration of the information processing apparatus 10. The information processing apparatus 10 includes, as software, an OS 100 and applications 110 and 120. The applications 110 and 120 run on the OS 100. The OS 100 is basic software that manages hardware such as the CPU 201 and the main memory 202 and provides execution environments. As illustrated in FIG. 2, the OS 100 of this exemplary embodiment provides a first environment 100a and a second environment 100b as the execution environments. Note that two types of execution environments are provided in the illustrated example, but the OS 100 may provide three or more types of execution environments.

The applications 110 and 120 are pieces of software (application programs) that perform specific information processing. In this exemplary embodiment, there are the application 110 that runs in the first environment 100a and the application 120 that runs in the second environment 100b, the applications 110 and 120 running depending on the execution environment provided by the OS 100. Note that in the example in FIG. 2, the applications 110 and 120 are respectively illustrated for the first environment 100a and the second environment 100b, but this merely represents a relationship between the pieces of software. Normally, in each execution environment provided by the OS 100, corresponding multiple applications 110 or multiple applications 120 may run.

The multiple execution environments provided by the OS 100 will further be described. Windows (registered trademark) 10 by Microsoft Corporation is assumed as an example of the OS 100 providing the multiple execution environments. Windows 10 provides an execution environment called a desktop mode designed to be used by a desktop or notebook personal computer and an execution environment called a tablet mode designed to be used by a tablet terminal. In the desktop mode, applications for the desktop mode that are called a desktop application run. In the tablet mode, applications for the tablet mode that are called a store application run.

In the store applications that run in the tablet mode among the applications that run on Windows 10, inter-process communication with a different application (a store application or a desktop application) is strictly restricted. Specifically, starting a different application with a unique protocol and delivering parameters to the counterpart application at the time of the starting are only allowed. A unique protocol for starting an application has a predetermined protocol name, and a target application and the OS are associated with each other by using a predetermined method. Accordingly, when the unique protocol is called, the application associated with the called protocol is started. Note that the protocol name needs to be a name that has not been used as the protocol name of a protocol used by the different application to be used by the information processing apparatus 10.

Hereinafter, a case where the application 110 that runs in the first environment 100a of the OS 100 illustrated in FIG. 2 is subject to the same restriction in inter-process communication as that on the store application described above will be described as an example. In other words, the application 110 is only allowed to start a different application 110 or the application 120 that runs in the second environment 100b by using a unique program and deliver parameters to the application 110 or 120, that is, a counterpart application, at the time of the starting. Note that the OS 100 may provide three or more types of execution environments in the description aforementioned with reference to FIG. 2, but, for simplicity, a case where the OS 100 provides two types of execution environments will herein be described as an example.

Functional Configuration of Information Processing Apparatus

Figure 3:
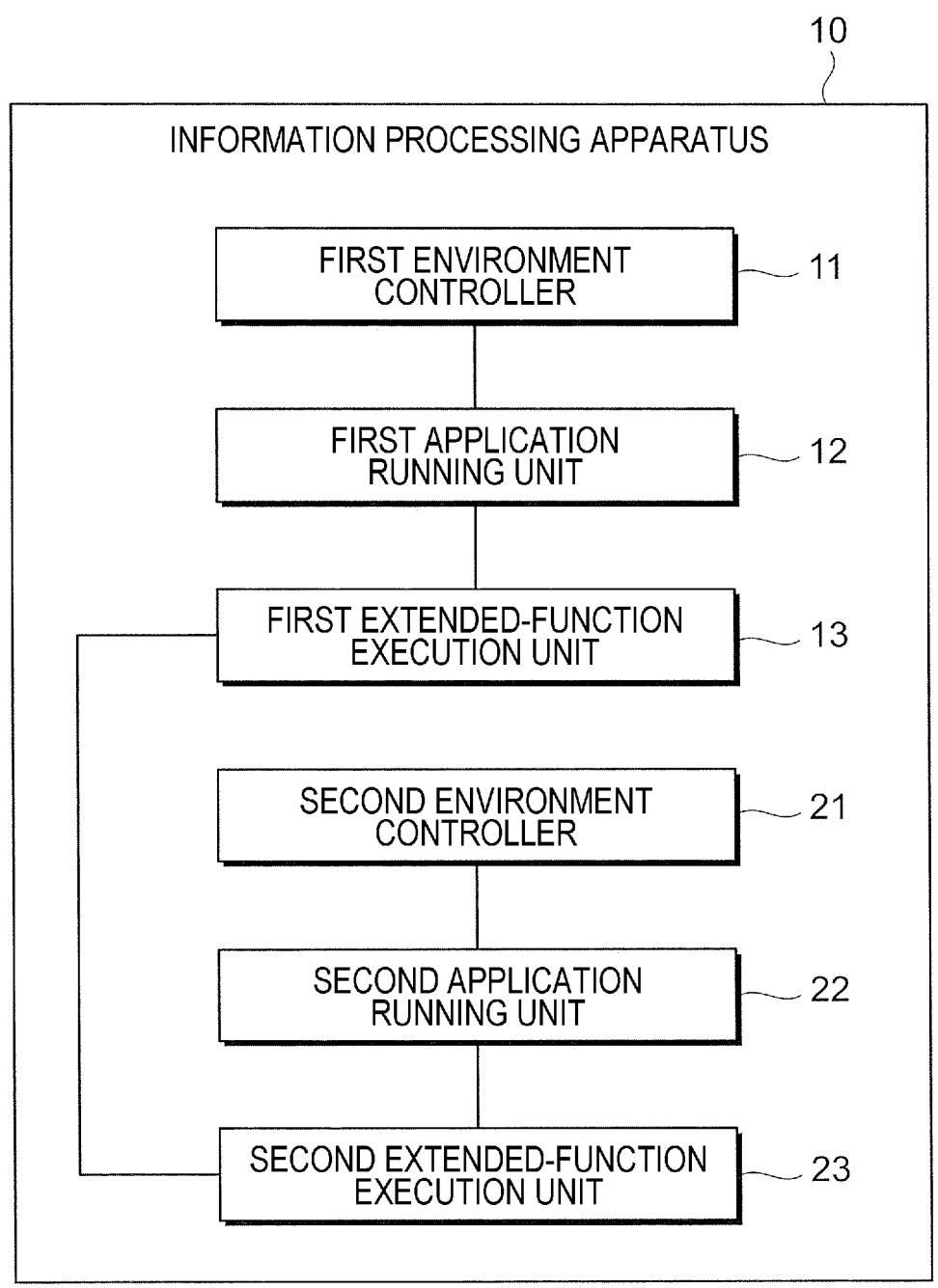
FIG. 3 is a diagram illustrating an example functional configuration of the information processing apparatus.

FIG. 3 is a diagram illustrating an example functional configuration of the information processing apparatus 10. The information processing apparatus 10 includes a first environment controller 11, a first application running unit 12, a first extended-function execution unit 13, a second environment controller 21, a second application running unit 22, and a second extended-function execution unit 23. The first environment controller 11, the first application running unit 12, and the first extended-function execution unit 13 are an example of a first controller. The second environment controller 21, the second application running unit 22, and the second extended-function execution unit 23 are an example of a second controller. When the two types of execution environments are not discriminated from each other in the description, the terms "environment controllers 11 and 21", "application running units 12 and 22", and "extended-function execution units 13 and 23" are simply used.

The first environment controller 11 is a controller that controls operations in the first environment 100a illustrated in FIG. 2. The first environment controller 11 is implemented in such a manner that the CPU 201 runs the OS 100 and manages and controls processes in the first environment 100a. The application 110 is thus run under the control of the first environment controller 11.

The first application running unit 12 is a process execution unit that operates in the first environment 100a. The first application running unit 12 is implemented by the CPU 201 and runs the application 110 in the first environment 100a controlled by the first environment controller 11. To execute a process of the application 110, the first application running unit 12 starts a different application 110 and calls the first extended-function execution unit 13.

The first extended-function execution unit 13 is a process execution unit that provides an extended function related to a process executed by the first application running unit 12. The first extended-function execution unit 13 is implemented by the CPU 201 and runs a different application 110 in the first environment 100a controlled by the first environment controller 11, the different application 110 being different from the application 110 run by the first application running unit 12. The first extended-function execution unit 13 is called by the first application running unit 12 and provides a specific function (extended function). The first extended-function execution unit 13 may also be called by the second extended-function execution unit 23 that operates in the second environment 100b. This will be described in detail later. Although various functions are conceivable as the function provided by the first extended-function execution unit 13, for example, a function for information exchange with a different process may be provided. The different process that is the target of the function may be a different process executed in the first environment 100a or may be a different process executed in the second environment 100b.

The second environment controller 21 is a controller that controls operations in the second environment 100b illustrated in FIG. 2. The second environment controller 21 is implemented in such a manner that the CPU 201 runs the OS 100. The second environment controller 21 manages and controls processes in the second environment 100b. The application 120 is thus run under the control of the second environment controller 21.

The second application running unit 22 is a process execution unit that operates in the second environment 100b. The second application running unit 22 is implemented by the CPU 201 and runs the application 120 in the second environment 100b controlled by the second environment controller 21. To execute a process of the application 120, the second application running unit 22 starts a different application 120 and calls the second extended-function execution unit 23.

The second extended-function execution unit 23 is a process execution unit that provides an extended function related to a process executed by the second application running unit 22. The second extended-function execution unit 23 is implemented by the CPU 201 and runs a different application 120 in the second environment 100b controlled by the second environment controller 21, the different application 120 being different from the application 120 run by the second application running unit 22. The second extended-function execution unit 23 is called by the second application running unit 22 and provides a specific function (extended function). The second extended-function execution unit 23 may also be called by the first extended-function execution unit 13 that operates in the first environment 100a. This will be described in detail later. Although various functions are conceivable as the function provided by the second extended-function execution unit 23, for example, a function for information exchange with a different process executed in the first environment 100a may be provided. Note that information exchange with a different process executed in the second environment 100b is not restricted, unlike the inter-process communication in the first environment 100a. Accordingly, information may be directly exchanged between the processes of the application 120, and thus the function provided by the second extended-function execution unit 23 does not have to be used.

As described above, the inter-process communication by the application 110 run in the first environment 100a is restricted, and starting a different application 110 or 120 by using a unique protocol and delivering parameters at the time of the starting are only allowed. Accordingly, information exchange between processes executed by the first application running unit 12 and the first extended-function execution unit 13 (hereinafter, first environment processes) is performed in such a manner that the counterpart application 110 is started by using the unique protocol and that parameters are delivered. Likewise, information exchange between the first environment process and a process executed by the second application running unit 22 or the second extended-function execution unit 23 (hereinafter, a second environment process) is performed in such a manner that the counterpart application 110 or 120 is started by using the unique protocol and that parameters are delivered.

APPLICATION EXAMPLE

A specific application example of the information processing apparatus 10 described above will be described. A case where an operation is performed for an external apparatus is operated by using the applications 110 and 120 respectively run by the application running units 12 and 22 will be described as an example. Specifically, suppose that an image forming apparatus is the external apparatus and an operation such as a printing and outputting operation is performed on the image forming apparatus from the application running units 12 and 22.

The configuration in the application example will further be described. Windows 10 described above is assumed to serve as the OS 100. Windows 10 allows a vendor to prepare an extended UI for implementing a unique function and look and feel for a V4 printer driver that is a driver for operating the image forming apparatus (a printer). The driver is used by both the desktop application (for example, Microsoft Word (trademark)) and the store application (for example, Microsoft Edge (trademark)). Accordingly, an extended UI used by the desktop application and an extended UI used by the store application are needed to be prepared. However, if the extended UIs are prepared as respective program modules (hereinafter, extended modules), the display functions for the respective extended UIs need to be implemented for the respective extended modules, and this leads to an increase of development cost. In addition, in a case where the extended modules behave differently (such as a case where look and feel of each UI is largely different, or the UIs are approximately the same but have different detail items such as different error message display methods), the extended modules are not operator friendly.

In the application example, the extended-UI display function is implemented in only one of an extended module in the first environment 100a and an extended module in the second environment 100b, and the other extended module is configured to use the extended UI displayed by the extended module in which the display function is implemented. In a specific example, the extended-UI display function is implemented in the extended module in the first environment 100a (hereinafter, a first-environment extended module), and the extended module in the second environment 100b (hereinafter, a second-environment extended module) uses the display function of the first-environment extended module to display the extended UI.

The application example will be described, with the functional configuration in FIG. 3 being applied to the application example. The first application running unit 12 executes a first environment process on the basis of a store application (application 110). The first extended-function execution unit 13 executes a first environment process on the basis of a first-environment extended module that is a driver. Since the extended-UI display function is implemented in the first-environment extended module, the first extended-function execution unit 13 operates the display mechanism 204 illustrated in FIG. 2 and thereby causes the display 210 to display the screen of the extended UI (hereinafter, a UI screen). The UI screen is a setting screen that presents the settings information of the driver and that receives a setting change operation performed by the operator. After the operator performs the operation on the UI screen, the result of the operation (the result of processing by the first extended-function execution unit 13) is reflected in the driver settings. In addition, the information may be delivered from the first extended-function execution unit 13 to the first application running unit 12 by a method predetermined by the OS 100.

In contrast, the second application running unit 22 executes a second environment process on the basis of a desktop application (application 120). The second extended-function execution unit 23 executes a second environment process on the basis of a second-environment extended module that is a driver. The second-environment extended module does not have the extended-UI display function and is thus designed to use the display function of the first-environment extended module to display the UI screen. Accordingly, the second extended-function execution unit 23 calls the first extended-function execution unit 13 and causes the display 210 to display the UI screen on the basis of the display function of the first-environment extended module. After the operator completes the operation on the UI screen, the first extended-function execution unit 13 calls the second extended-function execution unit 23 and delivers the result of the operation (the result of processing by the first extended-function execution unit 13) to the second extended-function execution unit 23. The second extended-function execution unit 23 reflects the processing result received from the first extended-function execution unit 13 in the driver settings. In addition, the information may be delivered from the second extended-function execution unit 23 to the second application running unit 22 by a method predetermined by the OS 100.

As described above, in the case where the second application running unit 22 uses the driver, the first extended-function execution unit 13 is called by the second extended-function execution unit 23, the UI screen is displayed by using the display function of the first extended-function execution unit 13, and the operation performed by the operator is received. Accordingly, the operator may perform an operation for the driver settings on the same UI screen regardless of whether the environment is the first environment 100a or the second environment 100b. Note that as described above, how the first extended-function execution unit 13 operates (how the processing result is handled) varies depending on whether the first extended-function execution unit 13 is called by the first application running unit 12 or the second extended-function execution unit 23.

First Implementation Example

Figure 4:
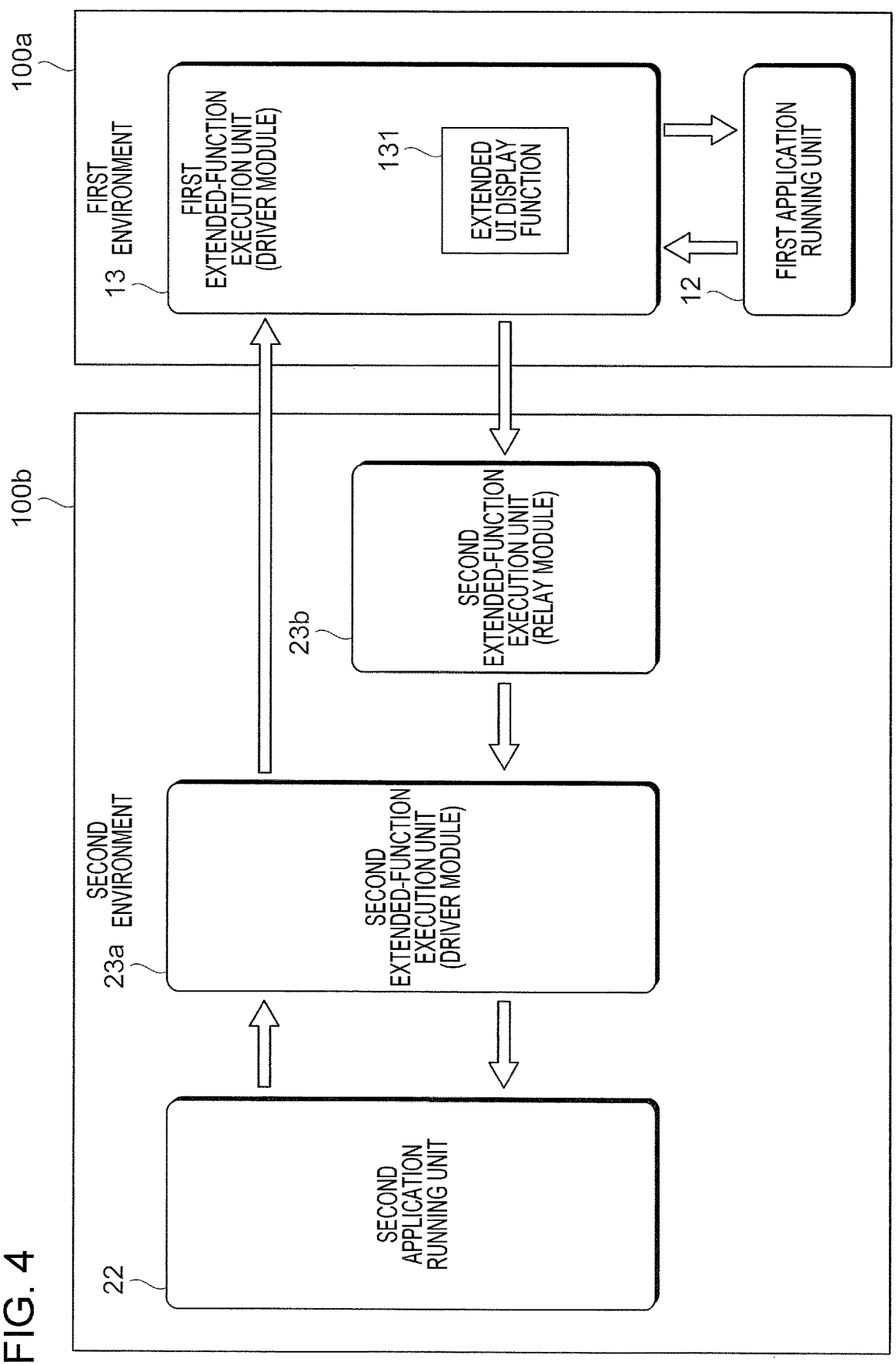
FIG. 4 is a diagram illustrating a first implementation example to which the information processing apparatus of an exemplary embodiment is applied.

FIG. 4 is a diagram illustrating a specific implementation example in which the information processing apparatus 10 of this exemplary embodiment is applied to the application example described above, that is, illustrating a first implementation example. How operations are performed when the second application running unit 22 performs an operation for driver setting for operating the image forming apparatus (not illustrated) will be described with reference to FIG. 4.

In the implementation example illustrated in FIG. 4, the first application running unit 12 and the first extended-function execution unit 13 operate in the first environment 100a. The first extended-function execution unit 13 runs a driver module (driver program) that is a first-environment extended module. The function provided by the first extended-function execution unit 13 includes an extended UI display function 131 that displays the UI screen.

In the implementation example illustrated in FIG. 4, the second application running unit 22 and two second extended-function execution units 23a and 23b operate in the second environment 100b. The second extended-function execution unit 23a runs a driver module that is a second-environment extended module. The second extended-function execution unit 23b runs a relay module that is a second-environment extended module. The relay module run by the second extended-function execution unit 23b is the second-environment extended module that relays information transmission between the second extended-function execution unit 23a and the first extended-function execution unit 13. Accordingly, the second extended-function execution unit 23b is a relay unit that relays and transmits the result of processing by the first extended-function execution unit 13 to the second extended-function execution unit 23a. Note that the relay module is the application 120 (desktop application) without a UI and executes a process different from a process executed by the second extended-function execution unit 23a.

Figure 5:
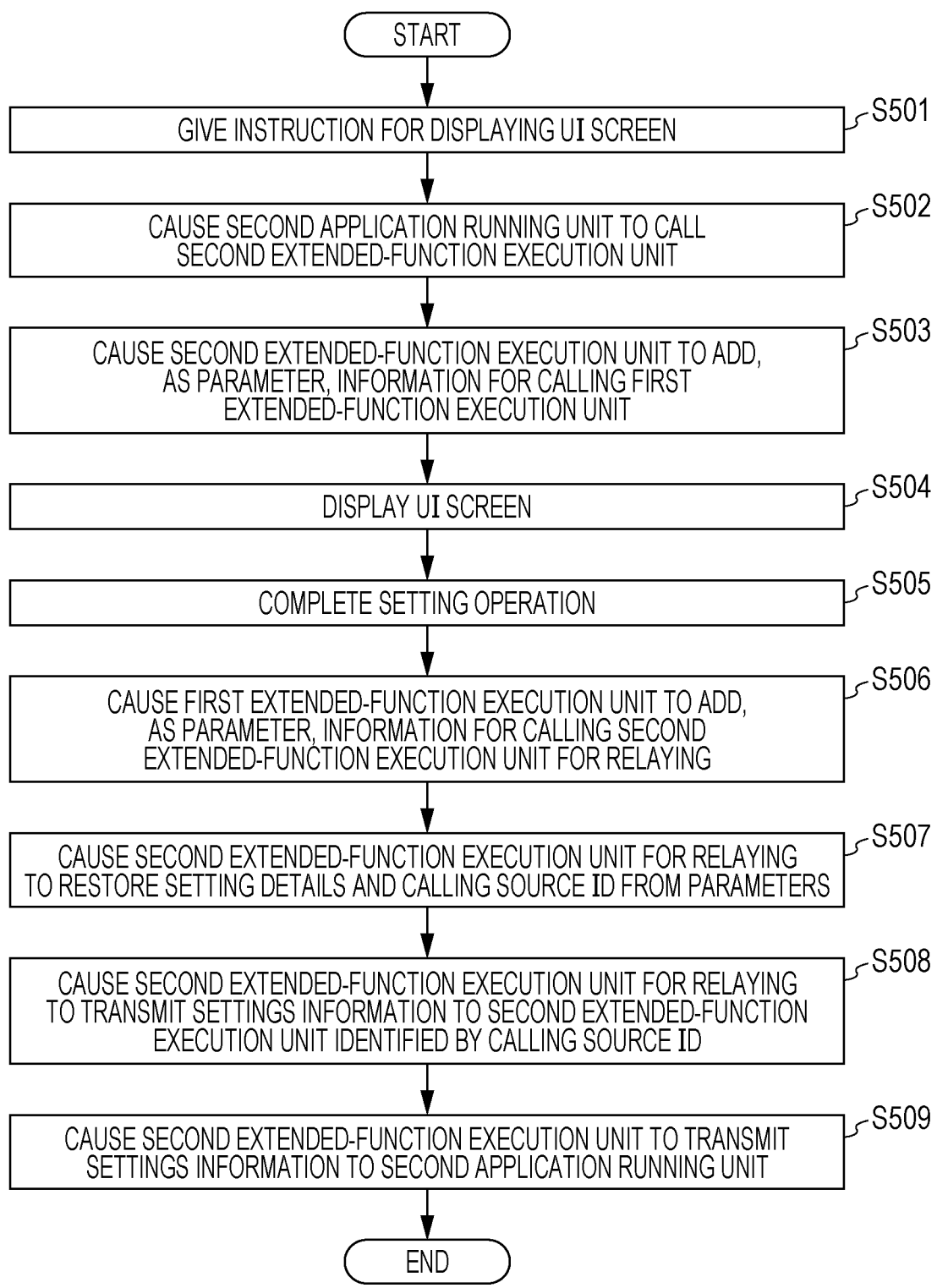
FIG. 5 is a flowchart illustrating operations performed by the information processing apparatus when a driver setting operation is performed from a second application running unit in the first implementation example.

FIG. 5 is a flowchart illustrating operations performed by the information processing apparatus 10 when a driver setting operation is performed from the second application running unit 22 in the first implementation example illustrated in FIG. 4. First, after the operator performs an operation as an instruction for displaying the UI screen given to the second application running unit 22 (S501), the second application running unit 22 starts the driver module and calls the second extended-function execution unit 23a (S502). The second extended-function execution unit 23a starts the driver module of the first environment 100a by using a unique protocol and calls the first extended-function execution unit 13 (S503). At this time, the second extended-function execution unit 23a delivers initial values for driver settings and a calling source identification (ID) as parameters to the first extended-function execution unit 13. The calling source ID is information for identifying the process that calls the first extended-function execution unit 13 (process executed by the second extended-function execution unit 23a). The format of the calling source ID is converted to, for example, a text format, and the calling source ID is added as a parameter of the unique protocol. The format of the initial values for the driver settings is converted to a text format through, for example, Base64 encoding, and the initial values are added as parameters of the unique protocol. In other words, step S503 corresponds to causing, by using a first protocol that is the unique protocol, the second extended-function execution unit 23a serving as a first execution unit to start the first extended-function execution unit 13 serving as a second execution unit.

The first extended-function execution unit 13 thus called restores the initial values for the driver settings included in the parameters received from the second extended-function execution unit 23a and causes the extended UI display function 131 to display the UI screen on the display 210 by using the initial values (S504). The operator may perform an operation on the displayed UI screen and input desired driver settings. The operator may also perform a predetermined operation (for example, an operation for selecting "Finish" button displayed on the UI screen or the like) and thereby complete the setting operation.

After the operation for completing the setting operation is performed (S505), the first extended-function execution unit 13 cancels the displaying of the UI screen. The first extended-function execution unit 13 starts the relay module in the second environment 100b by using a unique protocol and calls the second extended-function execution unit 23b for relaying (S506). At this time, the first extended-function execution unit 13 delivers, to the second extended-function execution unit 23b, as parameters, settings details (set values including the details of the operation performed on the UI screen) and the calling source ID that is added as the parameter in the calling in step S503. The format of the settings details is converted to a text format through, for example, Base64 encoding, and the settings details are added as the parameters of the unique protocol. In other words, step S506 corresponds to causing the first extended-function execution unit 13 serving as the second execution unit to start the second extended-function execution unit 23b serving as a third execution unit by using a second protocol that is the unique protocol and to deliver information regarding a processing result to the third execution unit.

The called second extended-function execution unit 23b for relaying restores the settings details and the calling source ID that are included in the parameters received from the first extended-function execution unit 13 (S507). The second extended-function execution unit 23b for relaying transmits the settings details information to the second extended-function execution unit 23a identified by the calling source ID (S508). The information exchange between the second extended-function execution unit 23a and the second extended-function execution unit 23b is performed through normal inter-process communication controlled by the OS 100 and used in the second environment 100b. In other words, step S508 corresponds to causing the second extended-function execution unit 23b serving as the third execution unit to transmit information regarding a result of processing performed by the first extended-function execution unit 13 serving as the second execution unit to the second extended-function execution unit 23a serving as the first execution unit through inter-process communication executable between the second extended-function execution unit 23*b* and the second extended-function execution unit 23*a* serving as the first execution unit. Thereafter, the second extended-function execution unit 23*a* transmits the settings details information to the second application running unit 22 through the normal inter-process communication controlled by the OS 100 and used in the second environment 100*b* (S509).

Second Implementation Example

Figure 6:
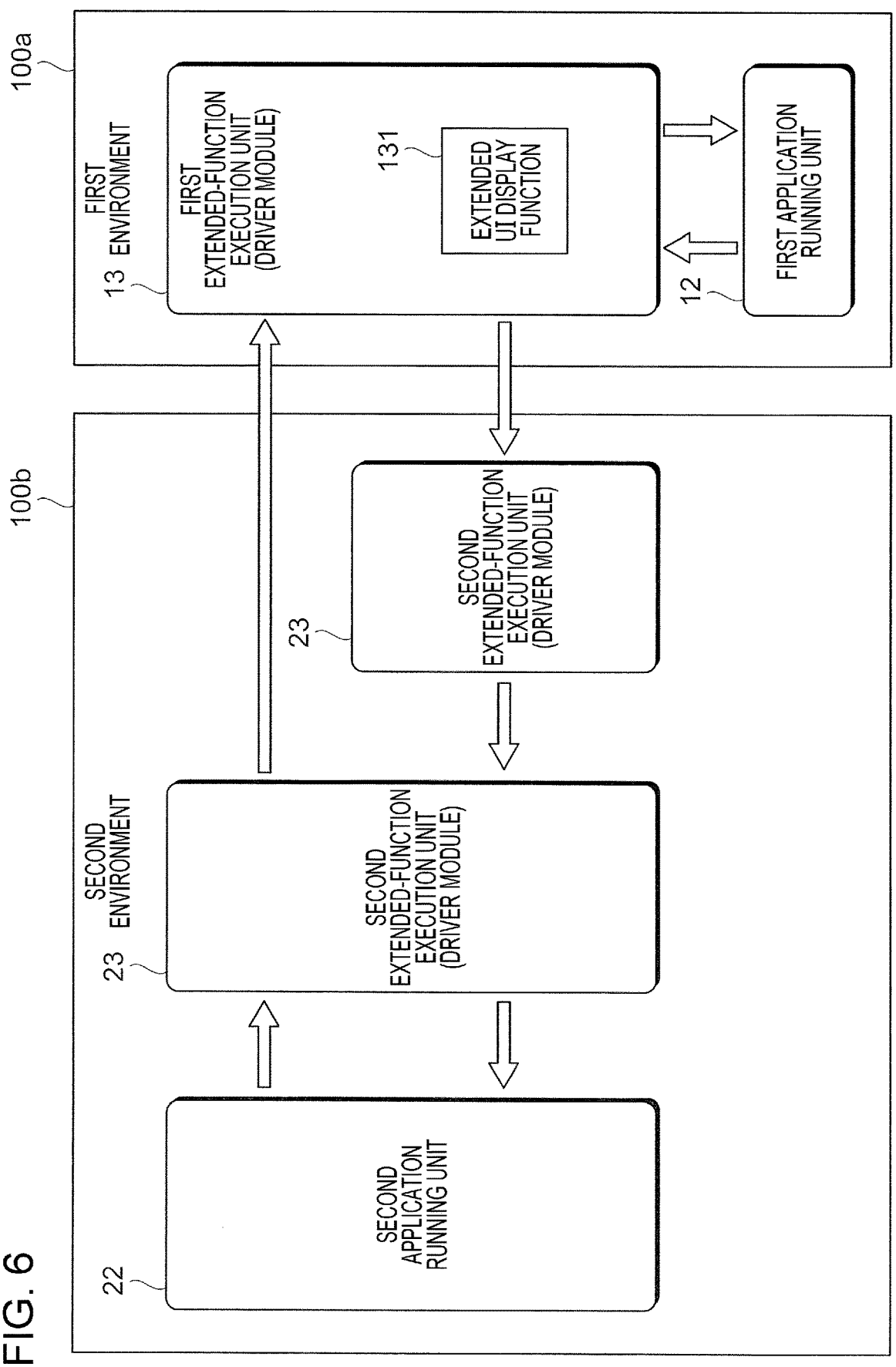
FIG. 6 is a diagram illustrating a second implementation example to which the information processing apparatus of this exemplary embodiment is applied.

FIG. 6 is a diagram illustrating a specific implementation example in which the information processing apparatus 10 of this exemplary embodiment is applied to the application example described above, that is, illustrating a second implementation example. How operations are performed when the second application running unit 22 performs an operation for driver setting for operating the image forming apparatus (not illustrated) will be described with reference to FIG. 6.

In the implementation example illustrated in FIG. 6, the first application running unit 12 and the first extended-function execution unit 13 operate in the first environment 100*a*. The first extended-function execution unit 13 runs a driver module that is a first-environment extended module. The function provided by the first extended-function execution unit 13 includes the extended UI display function 131 that displays the UI screen.

In the implementation example illustrated in FIG. 6, the second application running unit 22 and the second extended-function execution unit 23 operate in the second environment 100*b*. In the second implementation example, unlike the first implementation example described with reference to FIGS. 4 and 5, one second extended-function execution unit 23 is provided. The second extended-function execution unit 23 is called by the second application running unit 22 and is also called by the first extended-function execution unit 13. As to be described later, the second extended-function execution unit 23 called by the second application running unit 22 and the second extended-function execution unit 23 called by the first extended-function execution unit 13 operate in respective different processes, and thus FIG. 6 illustrates the two second extended-function execution units 23. Depending on whether the second extended-function execution unit 23 is called by the second application running unit 22 or the first extended-function execution unit 13, the second extended-function execution unit 23 operates differently. Specific operations performed by the second extended-function execution unit 23 will be described later.

FIG. 7 is a flowchart illustrating operations performed by the information processing apparatus 10 when a driver setting operation is performed from the second application running unit 22 in the second implementation example illustrated in FIG. 6. In the operations illustrated in FIG. 7, the same operations as the operations performed until step S505 illustrated in FIG. 5 are performed until step S705 in which the first extended-function execution unit 13 receives the operation for completing the setting operation.

After the operation for completing the setting operation is performed (S705), the first extended-function execution unit 13 cancels the displaying of the UI screen. The first extended-function execution unit 13 starts the driver module in the second environment 100*b* by using the unique protocol and calls the second extended-function execution unit 23 (S706). At this time, the first extended-function execution unit 13 delivers, to the second extended-function execution unit 23, settings details as parameters (set values including the details of the operation performed on the UI screen) and the calling source ID added as the parameter in the calling in step S703. The driver module started at this time is the same driver module started in step S702, that is, the application 120 (the desktop application), but a process for the driver module is different from the process executed by the second extended-function execution unit 23 called in step S702.

The second extended-function execution unit 23 thus called restores the settings details and the calling source ID that are included in the parameters received from the first extended-function execution unit 13 (S707). The second extended-function execution unit 23 transmits settings details information to the second extended-function execution unit 23 (the second extended-function execution unit 23 called in step S702) identified by the calling source ID (S708). The information exchange between the second extended-function execution units 23 is performed through the normal inter-process communication controlled by the OS 100 and used in the second environment 100*b*. Thereafter, the second extended-function execution unit 23 called in step S702 transmits the settings details information to the second application running unit 22 through the normal inter-process communication controlled by the OS 100 and used in the second environment 100*b* (S709).

As described above, in the second implementation example, the operations performed by the second extended-function execution unit 23 called in step S706 are different from the operations performed by the second extended-function execution unit 23 called in step S702. The second extended-function execution unit 23 called in step S706 plays the same role as that of the second extended-function execution unit 23*b* in the first implementation example. In other words, in the second implementation example, the relay module in the first implementation example is replaced with the driver module in the second environment 100*b*, and the second extended-function execution unit 23 called by the first extended-function execution unit 13 serves as the second extended-function execution unit 23 for relaying.

Operations Performed when First Extended-Function Execution Unit is Started in Multiple Processes Each of the first implementation example and the second implementation example may be applied to a case where the first extended-function execution unit 13 is called from multiple processes in the second environment 100*b*. Assume a case where the second extended-function execution unit 23 is called for a driver setting operation in multiple processes. In this case, the second extended-function execution units 23 in the respective processes call the first extended-function execution unit 13. However, the operations of the first extended-function execution unit 13 include receiving of an operation performed by the operator on the UI screen, and thus the first extended-function execution unit 13 may be configured not to perform the multiple operations in parallel. Instead, the first extended-function execution unit 13 may serially perform operations in response to the calling by the respective second extended-function execution units 23 while performing exclusive control.

Each second extended-function execution unit 23 provides the calling source ID as the parameter when calling the first extended-function execution unit 13. The calling source ID varies with the process that calls the first extended-function execution unit 13. Accordingly, pieces of settings details information are transmitted from the first extended-function execution unit 13 to the second extended-function execution units 23 respectively identified by the calling source IDs.

The exemplary embodiment of the present invention has heretofore been described, but the technical scope of the present invention is not limited to the exemplary embodiment described above. Various modifications and configuration replacement performed without departing from the scope of the technical spirit of the invention are included in the invention. For example, the example in which the extended-function execution units 13 and 23 are applied to the driver module for the image forming apparatus has been described in the application and implementation examples, but the exemplary embodiment is not limited to the examples. The exemplary embodiment is applicable to various configurations in which normal inter-process communication controlled by the OS 100 is restricted and information is allowed to be delivered in such a manner that one process execution unit starts a different process execution unit and provides parameters.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a first application running unit that operates in an execution environment and runs an application program;
a first function execution unit that operates in the execution environment and provides a specific function after the first function execution unit is called by the first application running unit;
a second application running unit that operates in a different execution environment different from the execution environment and runs a different application program different from the application program; and
a second function execution unit that operates in the different execution environment, starts execution of the first function execution unit after the second function execution unit is called by the second application running unit, acquires a result of processing performed by the first function execution unit, and transmits the result to the second application running unit.

2. The information processing apparatus according to claim 1,
wherein the second function execution unit starts the first function execution unit and delivers, to the first function execution unit, information to be used for the processing by the first function execution unit, the second function execution unit delivering the information as a parameter by starting the first function execution unit, and
wherein the first function execution unit starts the second function execution unit and delivers information regarding the result of the processing to the second function execution unit, the first function execution unit delivering the information as a parameter by starting the second function execution unit.

3. The information processing apparatus according to claim 1,
wherein the second function execution unit transmits information regarding the result of the processing to the second application running unit through inter-process communication controlled by an operating system, the information being acquired from the first function execution unit.

4. The information processing apparatus according to claim 2,
wherein the second function execution unit transmits, to the second application running unit through inter-process communication controlled by an operating system, the information acquired from the first function execution unit.

5. The information processing apparatus according to claim 2,
wherein the second function execution unit started by the first function execution unit operates in a different process that is different from a process for the second function execution unit called by the second application running unit, extracts the result of the processing by the first function execution unit from the parameter acquired from the first function execution unit, and relays the result to the second function execution unit called by the second application running unit.

6. The information processing apparatus according to claim 1,
wherein the first function execution unit has functions of displaying a setting screen for a specific setting detail on a display and receiving an operation performed on the setting screen, and
wherein the second function execution unit causes the started first function execution unit to perform displaying of the setting screen and receiving of a setting operation performed by an operator, the displaying of the setting screen and receiving of the setting operation being related to the second application running unit.

7. The information processing apparatus according to claim 6,
wherein the first function execution unit started by the second function execution unit starts the second function execution unit and delivers information regarding the received operation to the second function execution unit, the first function execution unit delivering the information as a parameter by starting the second function execution unit.

8. The information processing apparatus according to claim 1,
wherein the first application and the second application are each a different one of
a desktop application run in a desktop mode of an operating system, and
a store application run in a tablet mode of the operating system.

9. The information processing apparatus according to claim 8, wherein the first function execution unit is an extended user interface (UI) module for implementing a display of a user interface (UI) screen when the first application is run.

10. An information processing apparatus comprising:
a first controller that performs control of operation of an image forming apparatus on a basis of a driver program, displays a setting screen, receives a setting configured by an operation performed on the setting screen, and reflects the setting in the control of the image forming apparatus; and a second controller that performs control of the operation of the image forming apparatus on a basis of a different driver program different from the driver program, causes execution of the first controller to display the setting screen when the different driver program is run, acquires, from the first controller, setting information regarding a setting configured by an operation performed on the setting screen, and reflects the setting based on the setting information in the control performed by the second controller over the image forming apparatus.

11. The information processing apparatus according to claim 10,
wherein the second controller starts a specific module in the first controller and delivers, to the first controller, information to be used by the first controller to display the setting screen, the second controller delivering the information as a parameter by starting the specific module in the first controller, and
wherein the first controller starts a specific module in the second controller and delivers the setting information as a parameter to the second controller by starting the specific module in the second controller.

12. A method for delivering information between a plurality of execution units that each execute a process of a program, the method comprising:
causing a first execution unit to start execution of a second execution unit by using a first protocol, wherein the first execution unit and the second execution unit operate in different execution environments;
causing the second execution unit to start execution of a third execution unit by using a second protocol and to deliver information regarding a result of processing performed by the second execution unit to the third execution unit; and
causing the third execution unit to transmit the information regarding the result of the processing to the first execution unit through inter-process communication that is executable between the third execution unit and the first execution unit, the information being acquired from the second execution unit.

13. The method according to claim 12,
wherein in the causing of the second execution unit to deliver the information regarding the result of the processing to the third execution unit, the information regarding the result of the processing is delivered to the third execution unit as a parameter provided when the second execution unit is caused to start the third execution unit, and
wherein in the causing of the third execution unit to transmit the information regarding the result of the processing to the first execution unit, the information regarding the result of the processing is transmitted to the first execution unit through inter-process communication controlled by an operating system.

14. An information processing apparatus comprising:
a hardware processor programmed to act as:
first application running means, operating in an execution environment, for running an application program;
first function execution means, operating in the execution environment, for providing a specific function after the first function execution means is called by the first application running means;
second application running means, operating in a different execution environment different from the execution environment, for running a different application program different from the application program; and
second function execution means, operating in the different execution environment, for starting execution of the first function execution means after the second function execution means is called by the second application running means, acquiring a result of processing performed by the first function execution means, and transmitting the result to the second application running means.

\* \* \* \* \*